US005127373A

United States Patent [19]

Mochizuki et al.

[11] Patent Number: 5,127,373

[45] Date of Patent: Jul. 7, 1992

[54] TWO CYCLE ENGINE WITH FUEL INJECTION

[75] Inventors: Norihisa Mochizuki; Sakae Makino, both of Iwata, Japan

[73] Assignee: Yamaha Hatsudoki Kabushiki Kaisha, Iwata, Japan

[21] Appl. No.: 690,102

[22] Filed: Apr. 23, 1991

[30] Foreign Application Priority Data

Apr. 24, 1990 [JP] Japan .......... 2-108376

[51] Int. Cl.[5] .......... F02B 33/04; F02M 51/00; G01L 7/00; G01L 3/26

[52] U.S. Cl. .......... 123/73 R; 123/494; 123/478; 73/756; 73/115

[58] Field of Search .......... 123/73 R, 73 A, 478, 123/494, 73 AD; 73/115, 756, 866.5

[56] References Cited

U.S. PATENT DOCUMENTS

| | | | |
|---|---|---|---|
| 4,399,706 | 8/1983 | List et al. | 73/115 |
| 4,446,833 | 5/1984 | Matsushita et al. | 123/73 R |
| 4,461,260 | 7/1984 | Nonaka et al. | 123/73 R |
| 4,549,430 | 10/1985 | Dobler et al. | 73/115 |
| 4,549,517 | 10/1985 | Kamiyama | 123/478 |
| 4,750,464 | 6/1988 | Staerzl | 123/494 |
| 4,866,989 | 9/1989 | Lawless | 73/756 |
| 4,898,035 | 2/1990 | Yajima et al. | 73/756 |
| 4,920,790 | 5/1990 | Stiles et al. | 123/478 |
| 4,957,089 | 9/1990 | Morikawa | 123/478 |
| 4,970,898 | 11/1990 | Walish et al. | 73/756 |
| 4,995,258 | 2/1991 | Frank | 123/478 |

*Primary Examiner*—E. Rollins Cross
*Assistant Examiner*—Thomas N. Moulis
*Attorney, Agent, or Firm*—Ernest A. Beutler

[57] ABSTRACT

A number of embodiments of mounting arrangements for the pressure sensor of a control for the fuel injection system of a two cycle crankcase compression internal combustion engine. The pressure sensor is mounted in such a way as to avoid the likelihood of the pressure signal being deteriorated due to fuel and lubricant accumulation and deterioration thereon. In some embodiments, this is done by an insulated mouting and in others this is done by positioning the pressure sensor in a scavenge passage to the engine. In the scavenge passage mounting arrangements, insulation is also employed.

31 Claims, 5 Drawing Sheets

TWO CYCLE ENGINE WITH FUEL INJECTION

BACKGROUND OF THE INVENTION

This invention relates to a fuel injection system for a two cycle engine and more particularly to an improved arrangement for controlling the fuel injection of such an engine.

It is known that the fuel requirements of a crankcase compression two cycle internal combustion engine can be easily determined by sensing the pressure in the crankcase chamber. Therefore, a variety of fuel injection systems for such engines have been proposed that embody a pressure sensor mounted in the crankcase chamber of the engine and which provides a pressure signal to a controller which then controls the amount and timing of fuel injection. Although such systems are extremely effective, there are some problems attendant with them.

Specifically, when the sensor is mounted directly in the wall of the crankcase chamber, it tends to become heated due to the heat transmitted to it through the engine wall construction. As is well known, not only fuel is present in the crankcase chamber, but also lubricant can be present there. This lubricant may either be mixed with the fuel or delivered independently. The fuel and lubricant tend to accumulate in the crankcase chamber and can become deposited on the pressure sensor. If the pressure sensor becomes heated, however, then the fuel and particularly the oil may clog or solidify on the pressure sensor and adversely effect the pressure signal.

In order to obviate these problems, it has been proposed to remotely position the pressure sensor and to connect it to the crankcase chamber through a small conduit. However, this type of arrangement also has the disadvantage that fuel and lubricant may accumulate in the small conduit. With time, this accumulated fuel and lubricant can solidify and again the pressure signal becomes deteriorated.

It is, therefore, a principal object of this invention to provide an improved arrangement for sensing the pressure in a crankcase chamber of a two cycle engine and for controlling a fuel injector with the sensed pressure.

It is a further object of the invention to provide an arrangement for mounting the pressure sensor so that it will maintain a good signal during extending periods of operation and during extended time periods.

It is a further object of this invention to provide an arrangement for insuring against the accumulation of solidified or congealed fuel and lubricant on the pressure sensor of a two cycle crankcase compression internal combustion engine.

SUMMARY OF THE INVENTION

The invention is adapted to be embodied in a fuel injection system for a two cycle crankcase compression engine that comprises a crankcase, an induction system for delivering a charge to the crankcase and fuel injector means for injecting fuel into the intake charge. Scavenge passage means are provided for transferring the intake charge from the crankcase chamber to a combustion chamber of the engine. A pressure sensor is provided for sensing pressure in the crankcase and control means receive the signal from the pressure sensor and control the fuel injected from the fuel injector.

In accordance with a first feature of the invention, the pressure sensor is mounted by means of an insulating device so that it will not be heated from the mounting portion of the engine.

In accordance with another feature of the invention, the pressure sensor is mounted in the scavenge passage so that the pressure sensor will stay clean and maintain a good signal under all conditions.

DETAILED DESCRIPTION OF THE PREFERRED EMBODIMENTS

Figure 1:
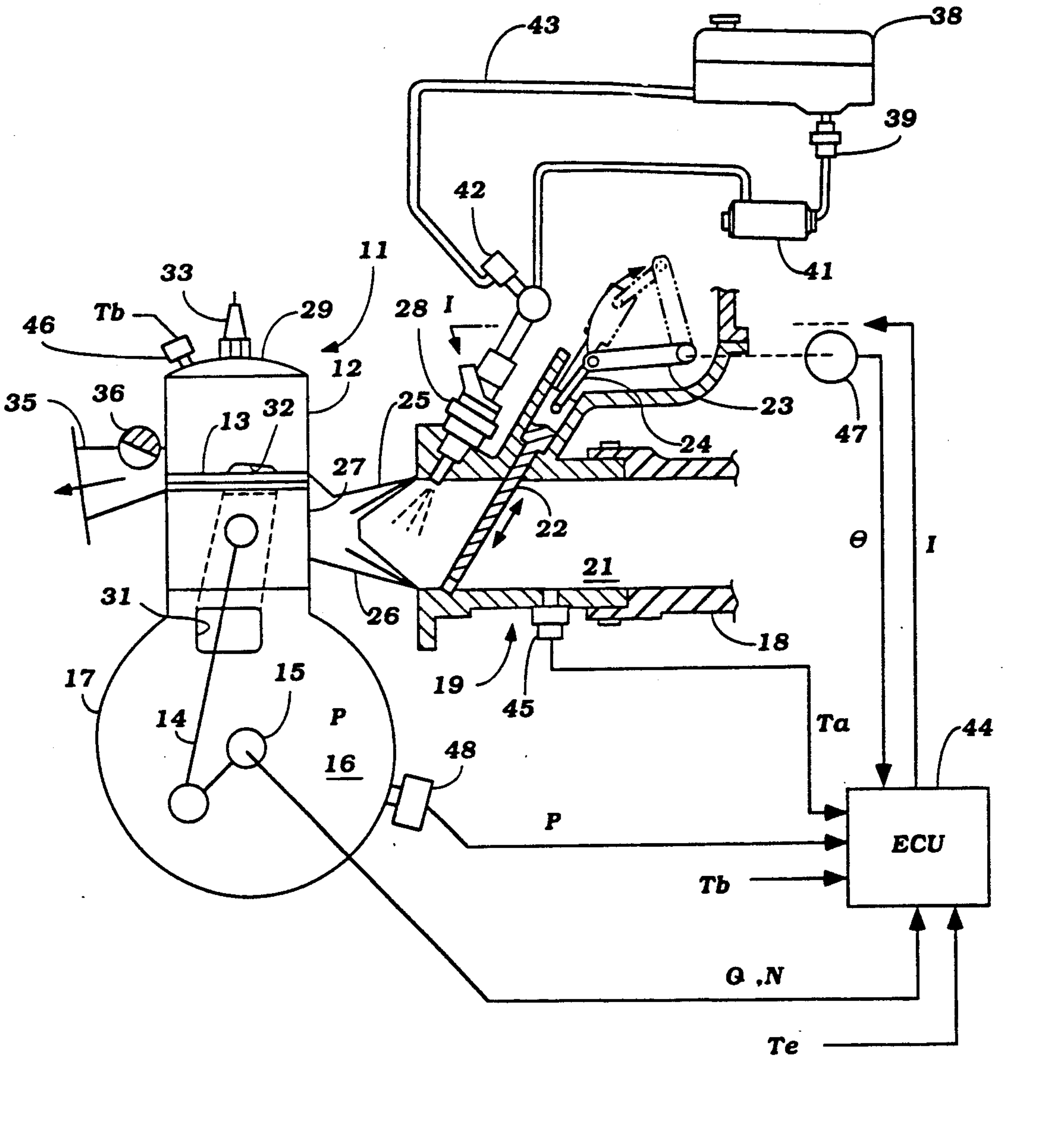
FIG. 1 is a partially schematic cross sectional view showing a single cylinder of an internal combustion engine constructed in accordance with an embodiment of the invention.
Figure 2:
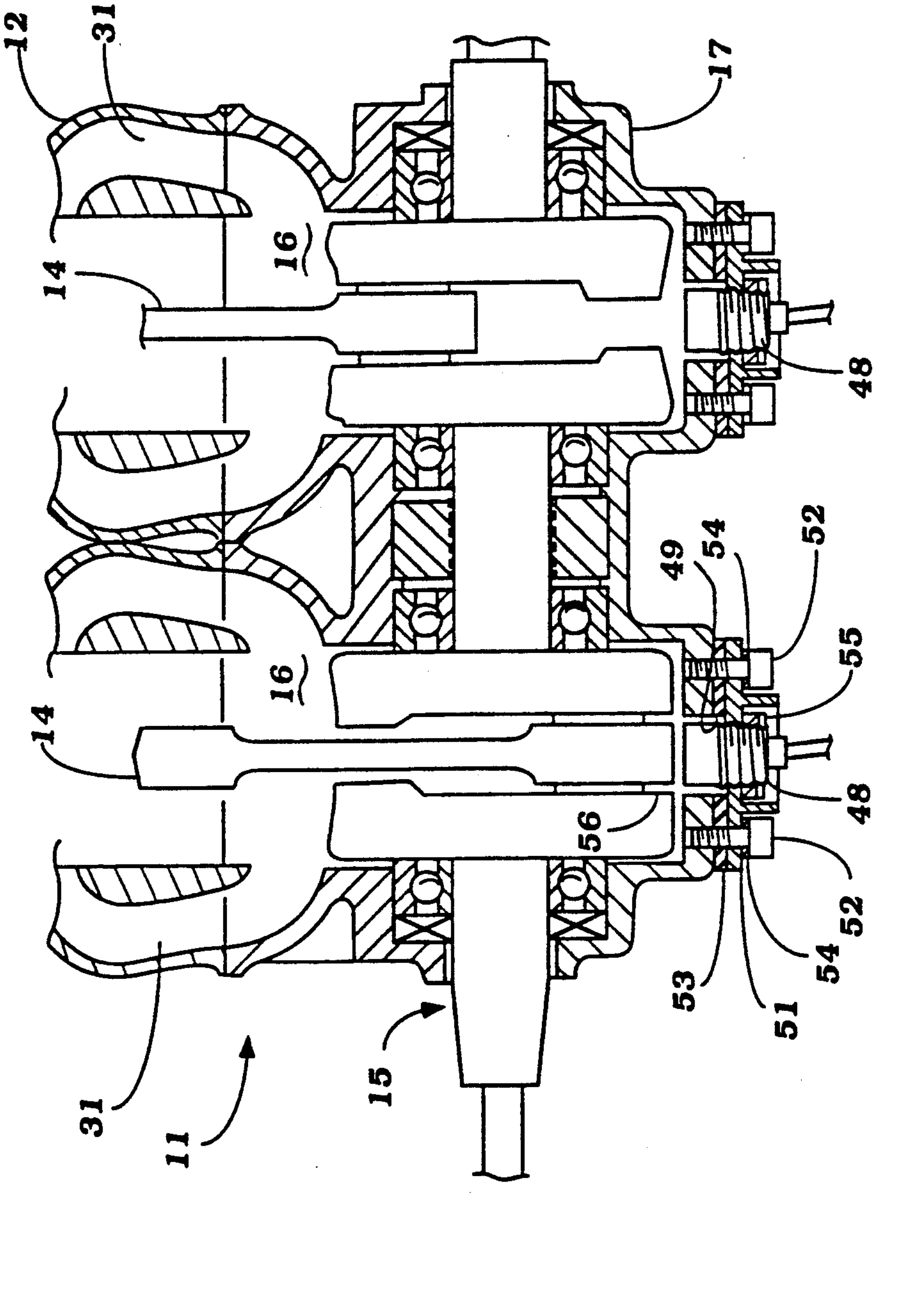
FIG. 2 is an enlarged cross sectional view taken through the crankcase of the engine and showing one embodiment of mounting arrangement for the pressure sensor.

Referring first to FIGS. 1 and 2, a two cycle crankcase compression internal combustion engine constructed in accordance with an embodiment of the invention is shown partially in schematic form in FIG. 1 and in cross section in FIG. 2 and is identified generally by the reference numeral 11. In the illustrated embodiment, the engine 11 is of the two cylinder in line type. It is to be understood, however, that the invention may be practiced in conjunction with engines having other cylinder numbers and other cylinder configurations. In addition, certain facets of the invention may be also employed in conjunction with rotary rather than reciprocating engines.

The engine 11 includes a cylinder block 12 having a pair of spaced cylinder bores in which pistons 13 reciprocate. The pistons 13 are connected by means of connecting rods 14 to individual throws of a crankshaft, indicated generally by the reference numeral 15. The crankshaft 15 is rotatably journaled within a crankcase chamber 16 formed by the lower portion of the cylinder block 12 and a crankcase member 17 that is affixed to the cylinder block in a suitable manner. It should be noted that there is one crankcase chamber 16 associated with each of the cylinder bores and pistons 13 and that these crankcase chambers are sealed from each other in an appropriate manner, as is typical with two cycle engine practice.

An intake charge is delivered to the individual crankcase chambers 16 by an induction system that includes an air intake device, shown partially in FIG. 1 and indicated by the reference numeral 18 which delivers air to a throttle body 19 which has an intake passage 21 in which a slide type throttle valve 22 is positioned. The throttle valve 22 is controlled by means of a control lever 23 that is connected to the throttle valve 22 by means of a link 24. The control lever 23 is operated by the operator in a suitable manner.

Downstream of the throttle body 19, there is provided an intake manifold, shown schematically and identified generally by the reference numeral 25 in which reed type check valves 26 are provided and which communicates with the individual crankcase chambers 16 through intake ports 27 formed in the cylinder block 12 at the base of the cylinder bores therein.

A fuel injector 28 is provided in each throttle body 19 for spraying fuel and the fuel injector 28 is controlled electronically, in a manner to be described.

The fuel air charge, which is admitted to the crankcase chamber 16 through the induction system already described is transferred, upon descent of the pistons 13, into a combustion chamber formed above the pistons by means of a cylinder head 29 that is affixed to the cylinder block in a suitable manner through a plurality of scavenge passages 31. The scavenge passages 31 terminate in scavenge ports 32 that extend through the cylinder block 12 in a known manner.

The charge which is transferred to the combustion chambers is then fired by spark plugs 33 mounted in the cylinder head 29 and fired by a suitable ignition system. The exhaust gases are discharged through exhaust ports 34 formed in the cylinder block 12 and which communicate with exhaust passages 35 and an exhaust manifold (not shown) and appropriate exhaust system. An exhaust control valve 36 is provided in the exhaust passages 35 for varying the effective area and the port timing so as to improve engine performance.

Fuel is supplied to the fuel injectors 28 from a fuel tank 38 through a fuel filter 39 by a high pressure fuel pump 41. A pressure control valve 42 is provided in the fuel manifold serving the injectors 28 and controls the fuel pressure by bypassing excess fuel back to the fuel tank 38 through a return conduit 43.

The construction of the engine 11 as thus far described may be considered to be conventional. For that reason, further details of the construction of the engine are not believed to be necessary to enable those skilled in the art to practice the invention.

As has been noted, the fuel injectors 28 are electronically controlled. For this purpose, there is provided an ECU, shown schematically in FIG. 1 and identified by the reference numeral 44 that receives a plurality of input signals indicative of ambient and engine conditions. These signals include signals Θ and N from a crankcase sensor that are indicative of crank angle and engine speed. In addition, an ambient air temperature signal Ta is supplied by a temperature sensor 45 in the throttle body 19 and an engine temperature signal Tb is supplied by a cylinder head temperature sensor 46 mounted in the cylinder head 29. There is provided an exhaust temperature sensor (not shown) which may be positioned in the exhaust passages 35 or exhaust manifold and which supplies the exhaust temperature signal Te. Furthermore, a throttle position sensor 47 supplies a signal Ⓗ indicative of the position of the throttle valve 21 and accordingly the load on the engine. The ECU may receive other signals of ambient or engine running conditions.

It has been found that the load of the engine and fuel requirements can be accurately sensed by a pressure sensor, indicated schematically at FIG. 1, by the reference numeral 48 which senses the crankcase pressure P and outputs a pressure signal p to the ECU 44. The ECU 44 then outputs an appropriate actuating signal I to the injectors 28 to control the timing of the initiation of fuel injection and the fuel injection amount by varying the duration or in other known manners.

The control for the fuel injectors 28 as aforedescribed may also be considered to be conventional. However, in conjunction with conventional structures of the type previously proposed, the mounting of the pressure sensor 48 in the wall of the crankcase member 17 has given rise to some problems. That is, the pressure sensor 48, due to its thermal contact with the engine through the wall of the crankcase member 17, will tend to cause it become heated. In addition to fuel, there is frequently also lubricant in the crankcase chamber 16 which may be supplied either through its mixing with the fuel or through a separate lubrication system. This fuel and lubricant can tend to congeal on the pressure sensor 48, particularly if the pressure sensor 48 is heated. This accumulation of liquids and particularly the lubricant will deteriorate the pressure signal p and can adversely effect the running of the engine. In accordance with the invention, however, the pressure sensors 48 are mounted in an insulated manner as best shown in FIG. 2 so as to avoid these deleterious effects.

As may be seen in FIG. 2, the crankcase member 17 is formed with an opening 49 that communicates with each crankcase chamber 16. A mounting plate 51 extends across this opening and is held in place by means of a plurality of threaded fasteners 52. However, unlike prior art constructions, there is provided a block 53 of insulating material between the mounting plate 51 and the crankcase member 17 so that the mounting plate 51 will be insulated. In addition, insulating washers 54 may be provided between the heads of the threaded fasteners 52 and the mounting plate 51 so as to further provide thermal insulation. The pressure sensors 45 are threaded into the mounting plate 51 and held in place by lock nuts 55. It should be noted that an annular air gap 56 also extends around the periphery of the pressure sensors 48 so as to provide further thermal insulation. As a result of this insulated mounting, the likelihood of fuel and lubricant congealing on the pressure sensor 48 will be substantially reduced and uniform performance may be maintained.

It should also be noted, as clearly shown in FIG. 2, that the inner face of the sensor 48 facing the crankcase chamber 16 is, in its mounted position, flush with the inner wall of the crankcase member 17. This permits a compact assembly and avoids the necessity for increasing the size of the crankcase chamber 16 for clearance purposes.

In some prior art constructions, it has been proposed to mount the pressure sensor away from the crankcase chamber and communicate with the crankcase chamber through a small pipe, as aforenoted. The problem of fuel and lubricant blocking the passage to the pressure sensor in the small pipe is also possible. In accordance with another feature of the invention, the pressure sensor 48 may be communicated with the crankcase chamber in a remote location so that it will not be subject to as much fuel and lubricant accumulation and, furthermore, in a position so that it will be swept by the intake charge transferred to the combustion chambers and hence kept clean. FIGS. 3 through 6 show a variety of embodiments of such mounting position.

Figure 3:
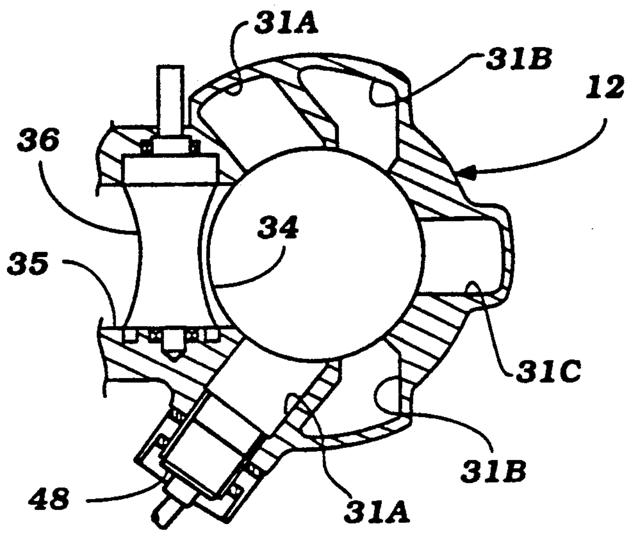
FIG. 3 is a cross sectional view taken through one of the cylinders and shows another embodiment of mounting of the pressure sensor.
Figure 4:
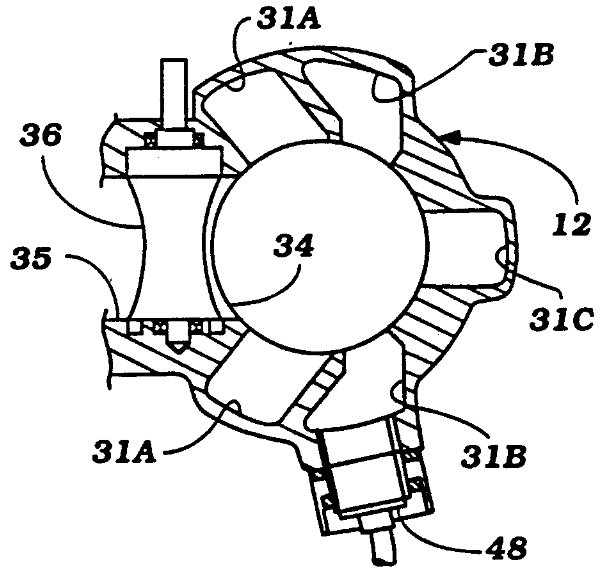
FIG. 4 is a cross sectional view, in part similar to FIG. 3, showing yet another mounting arrangement.
Figure 5:
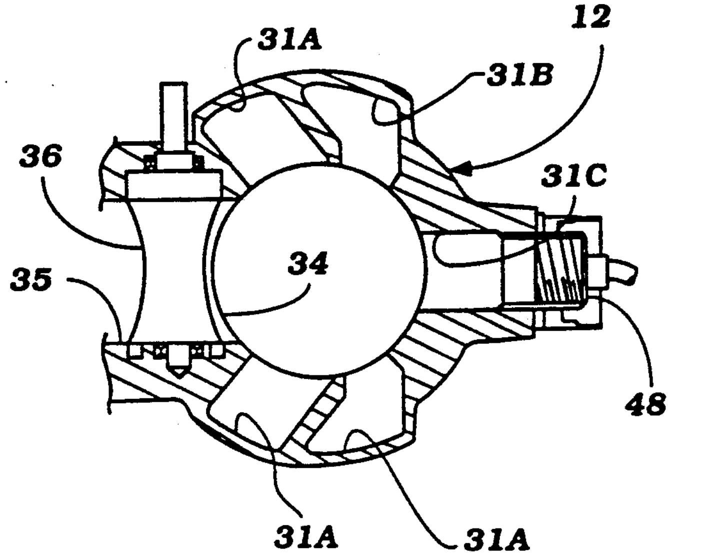
FIG. 5 is a cross sectional view, in part similar to FIGS. 3 and 4, showing yet another embodiment of the invention.

It has been previously noted that there may be a plurality of scavenge passages 31. FIGS. 3 through 6 show such a plurality of scavenge passages. These include a pair of scavenge passages 31A that are disposed closely adjacent and on opposite sides of the exhaust port 34 and exhaust passage 35. There are provided a second pair of scavenge passages 31B that are spaced further from the exhaust port 34 and exhaust passage 35 and adjacent the scavenge passages 31A. A further single scavenge passage 31C is provided in diametrically opposed relationship to the exhaust port 34 and exhaust passage 35. The pressure sensor 48 may be mounted in the peripheral wall of the cylinder block 12 in communication with either of the scavenge passages 31A as shown in FIG. 3, in communication with either of the scavenge passages 31B as shown in FIG. 4 or in communication with the single scavenge passage 35C as shown in FIG. 5.

Figure 6:
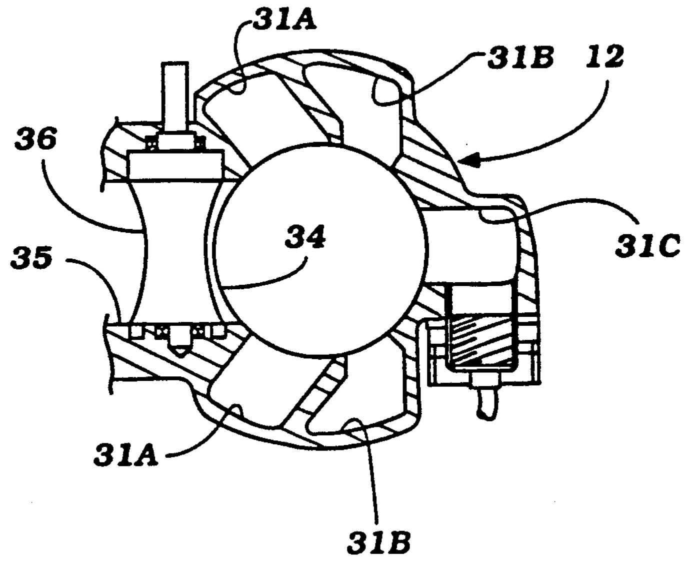
FIG. 6 is a cross sectional view, in part similar to FIGS. 3 through 5, and shows yet another embodiment for mounting the pressure sensor.

In such a peripheral wall mounting, it may be better insured that the intake charge will sweep across the pressure sensor 48 as the charge is transferred from the crankcase chambers 16 to the combustion chambers. However, it may be desireable to provide a side wall mounting as shown in FIG. 6, which illustrates the mounting in the single scavenge passage 31C as shown in FIG. 6. Such a mounting will tend to move the pressure sensor 48 out of the path of fuel and lubricant flow and hence will insure against a deteriorated signal for this reason.

Figure 7:
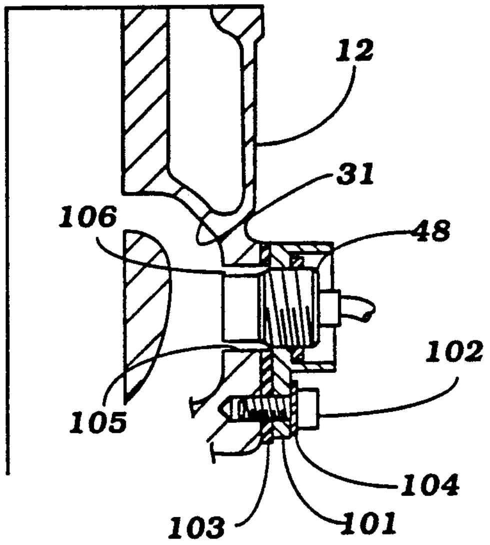
FIG. 7 is a cross sectional view taken along a plane perpendicular to the plane of FIGS. 3 through 6 and shows one method of mounting the pressure sensor within a scavenge passage.
Figure 8:
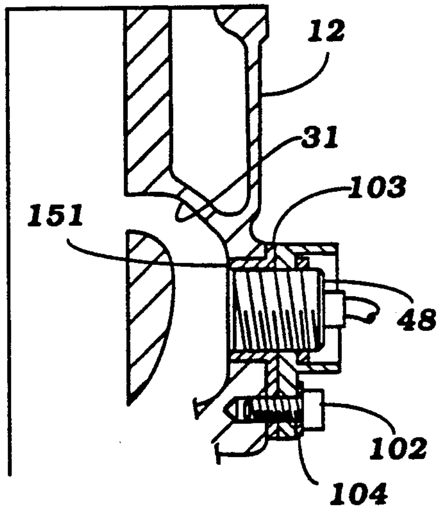
FIG. 8 is a cross sectional view, in part similar to FIG. 7, and shows another embodiment of mounting arrangement for the pressure sensor.
Figure 9:
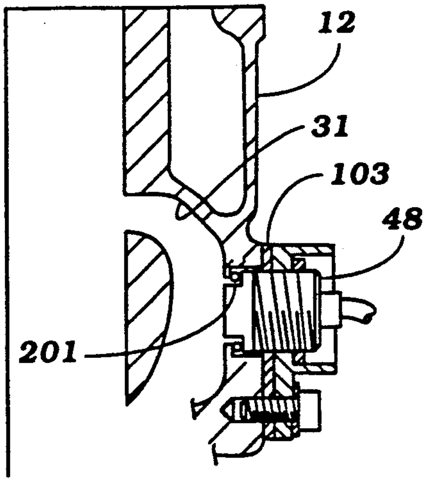
FIG. 9 is a cross sectional view, in part similar to FIGS. 7 and 8, and shows a still further embodiment of mounting arrangement for the pressure sensor within the scavenge passage.

The way in which the pressure sensors 48 may be mounted in the various scavenge passages can also be varied to achieve an insulating effect. FIGS. 7 through 9 show three such embodiments. Either of these three mounting embodiments may be employed in conjunction with the scavenge passage locations as shown in FIGS. 3 through 6.

FIG. 7 shows a mounting of the general type as employed in the crankcase mounting as shown in FIG. 7. In this embodiment, the pressure sensor 48 is threaded into a mounting plate 101 which is, in turn, affixed to the cylinder block 12 by a plurality of threaded fasteners 102. An insulating plate 103 is interposed between the mounting plate 101 and the cylinder block 12 and insulating washers 104 are mounted beneath the heads of the fasteners 102 and the plate 101. As with the embodiment of FIG. 1, the pressure sensor 48 extends through an enlarged opening 105, in this case formed in the cylinder block 102, to provide a further insulating air gap 106 therearound.

FIG. 8 shows a mounting arrangement similar to that of FIG. 7. However, in this embodiment, the insulating plate 103 has an extending portion 151 which fills the air gap of the previous embodiment but which provides thermal insulation around the periphery of the pressure sensor 48. This avoids air pockets while maintaining good insulation.

FIG. 9 shows another mounting arrangement wherein the pressure sensor 48 has a necked down portion that engages an 0 ring seal 201 that is interposed between it and the cylinder block 12 for insulation and sealing purposes.

As with the crankcase mounting arrangement, each of the mounting constructions shown in FIGS. 7 through 9 places the inner surface of the pressure sensor 48 in a smooth relationship with the surface of the cylinder block 12 defining the scavenge passageway 31 so as to provide an unobstructed flow surface for the intake charge. In addition, this insures that fuel and/or lubricant cannot be built up on the sides of the pressure sensor 48 and further that the cylinder block 12 need not be made oversized so as to compensate for any flow restriction as would occur if the pressure sensor 48 extended into the flow area.

It should be readily apparent that the aforedescribed constructions provide a very effective fuel injection control wherein a crankcase pressure sensor is operative to provide a good pressure signal under running conditions for a long period of time without deterioration. This is done by insulating the mounting and/or mounting the pressure sensor in a scavenge passage so that it will still sense crankcase pressure but be more removed from fuel and lubricant which may accumulate in the crankcase chamber. Of course, the foregoing description is that of preferred embodiments of the invention. Various changes and modifications may be made without departing from the spirit and scope of the invention, as defined by the appended claims.

We claim:

1. In a fuel injection system for a two cycle crankcase compression internal combustion engine comprising a crankcase, an induction system for delivering a charge to said crankcase, fuel injection means for injecting fuel into said intake charge, scavenge passage means for transferring said intake charge from said crankcase chamber to a combustion chamber of said engine, a pressure sensor having a sensing face for sensing pressure within said crankcase, and control means for receiving the signal from said pressure sensor and controlling the fuel injected from said fuel injector, the improvement comprising insulating means for mounting said pressure sensor to said engine with said sensing face in facing contact with an area of the engine where pressure is to be measured and insulating said pressure sensor sensing face from the temperature of said engine.

2. In a fuel injection system as set forth in claim 1 wherein said insulating means comprises an insulating spacer positioned between the pressure sensor and the engine wall in which the pressure sensor is mounted.

3. In a fuel injection system as set forth in claim 2 wherein the mounting arrangement further provides an insulating air gap between the pressure sensor and the mounting wall.

4. In a fuel injecting system as set forth in claim 2 wherein the pressure sensor is affixed to a plate and the plate is affixed to the wall of the engine with the insulting spacer being positioned between the plate and the engine wall.

5. In a fuel injection system as set forth in claim 4 wherein the mounting arrangement further provides an insulating air gap between the pressure sensor and the mounting wall.

6. In a fuel injection system as set forth in claim 1 wherein the fuel injector injects fuel into the induction system.

7. In a fuel injection system as set forth in claim 6 wherein said insulating means comprises an insulating spacer positioned between the pressure sensor and the engine wall in which the pressure sensor is mounted.

8. In a fuel injection system as set forth in claim 7 wherein the mounting arrangement further provides an insulating air gap between the pressure sensor and the insulating wall.

9. In a fuel injection system as set forth in claim 7 wherein the pressure sensor is affixed to a plate and the plate is affixed to the wall of the engine with the insulating spacer being positioned between the plate and the engine wall.

10. In a fuel injection system as set forth in claim 9 wherein the mounting arrangement further provides an insulating air gap between the pressure sensor and the mounting wall.

11. In a fuel injection system as set forth in claim 6 wherein the pressure sensor is mounted in a wall that defines a scavenge passage.

12. In a fuel injection system as set forth in claim 11 wherein the pressure sensor is mounted in a peripheral wall of the scavenge passage.

13. In a fuel injection system as set forth in claim 11 wherein the pressure sensor is mounted in a side wall of the scavenge passage.

14. In a fuel injection system as set forth in claim 11 wherein there are provided a plurality of scavenge passages and the pressure sensor is mounted in a wall defining one of the scavenge passages.

15. In a fuel injection system as set forth in claim 14 further including an exhaust port and wherein the pressure sensor is mounted in a scavenge passage positioned adjacent said exhaust port.

16. In a fuel injection system as set forth in claim 14 further including an exhaust port formed in the engine and wherein the pressure sensor is mounted in a scavenge passage that is not adjacent the exhaust port.

17. In a fuel injection system for a two cycle crankcase compression internal combustion engine comprising a crankcase, an induction system for delivering a charge to said crankcase, fuel injection means for injecting fuel into said intake charge, scavenge passage means for transferring said intake charge from said crankcase chamber of a combustion chamber of said engine, a pressure sensor for sensing pressure with said crankcase, and control means for receiving the signal from said pressure sensor and controlling the fuel injected from said fuel injector, the improvement comprising insulating means for mounting said pressure sensor to said engine and insulating said pressure sensor from the temperature of said engine, said pressure sensor being mounted in a wall of the engine that defines a scavenge passage.

18. In a fuel injection system as set forth in claim 17 wherein the pressure sensor is mounted in a peripheral wall of the scavenge passage.

19. In a fuel injection system as set forth in claim 17 wherein the pressure sensor is mounted in a side wall of the scavenge passage.

20. In a fuel injection system as set forth in claim 17 wherein there are provided a plurality of scavenge passages and the pressure sensor is mounted in a wall defining one of the scavenge passages.

21. In a fuel injection system as set forth in claim 20 further including an exhaust port and wherein the pressure sensor is mounted in a scavenge passage positioned adjacent said exhaust port.

22. In a fuel injection system as set forth in claim 20 further including an exhaust port formed in the engine and wherein the pressure sensor is mounted in a scavenge passage that is not adjacent the exhaust port.

23. In a fuel injection system as set forth in claim 20 wherein the pressure sensor is affixed to a plate and the plate is affixed to the wall of the engine with the insulating spacer being positioned between the gate and the engine wall.

24. In a fuel injection system for a two cycle crankcase compression internal combustion engine comprising a crankcase, an induction system for delivering a charge to said crankcase, fuel injection means for injecting fuel into said intake charge, scavenge passage means for transferring said intake charge from said crankcase chamber to a combustion chamber of said engine, a pressure sensor for sensing pressure within said crankcase, and control means for receiving the signal from said pressure sensor and controlling the fuel injected from said fuel injector, the improvement comprising said pressure sensor being mounted within the scavenge passage means to sense the pressure therein.

25. In a fuel injection system as set forth in claim 24 wherein the pressure sensor is mounted in a peripheral wall of the scavenge passage.

26. In a fuel injection system as set forth in claim 24 wherein the pressure sensor is mounted in a side wall of the scavenge passage.

27. In a fuel injection system as set forth in claim 24 wherein there are provided a plurality of scavenge passages and the pressure sensor is mounted in a wall defining one of the scavenge passages.

28. In a fuel injection system as set forth in claim 27 further including an exhaust port and wherein the pressure sensor is mounted in a scavenge passage positioned adjacent said exhaust port.

29. In a fuel injection system as set forth in claim 27 further including an exhaust port formed in the engine and wherein the pressure sensor is mounted in a scavenge passage that is not adjacent the exhaust port.

30. In a fuel injection system for a two cycle crankcase compression internal combustion engine comprising a crankcase, an induction system for delivering a charge to said crankcase, fuel injection means for injecting fuel into said intake charge, scavenge passage means for transferring said intake charge from said crankcase chamber to a combustion chamber of said engine, a pressure sensor for sensing pressure within said crankcase, and control means for receiving the signal from said pressure sensor and controlling the fuel injected from said fuel injector, the improvement comprising insulating means for mounting said pressure sensor to said engine and insulating said pressure sensor from the temperature of said engine comprising an insulating spacer positioned between said pressure sensor and the engine wall in which said pressure sensor is mounted and means providing an insulating air gap between said pressure sensor and said engine wall.

31. In a fuel injection system as set forth in claim 30 wherein the fuel injector injects fuel into the induction system.

* * * * *